(12) United States Patent
Bentivoglio et al.

(10) Patent No.: US 11,192,635 B2
(45) Date of Patent: Dec. 7, 2021

(54) ACTUATOR ARRANGEMENT FOR A FLEXIBLE CONTROL SURFACE OF AN AIRCRAFT, CONTROL SURFACE WITH ACTUATOR ARRANGEMENT, AND AIRCRAFT WITH FLEXIBLE CONTROL SURFACE

(71) Applicant: Airbus Operations GmbH, Hamburg (DE)

(72) Inventors: Marc Antonio Bentivoglio, Hamburg (DE); Marco Biondini, Hamburg (DE); Michael Hoeft, Hamburg (DE); Henrik Luettmann, Hamburg (DE); Malte Werwer, Hamburg (DE); Andre Thomas, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 822 days.

(21) Appl. No.: 16/133,102

(22) Filed: Sep. 17, 2018

(65) Prior Publication Data
US 2019/0084666 A1 Mar. 21, 2019

(30) Foreign Application Priority Data
Sep. 15, 2017 (DE) ...................... 10 2017 216 397.6

(51) Int. Cl.
*B64C 13/28* (2006.01)
*B64C 3/26* (2006.01)
*B64C 3/48* (2006.01)

(52) U.S. Cl.
CPC ................ *B64C 13/28* (2013.01); *B64C 3/26* (2013.01); *B64C 3/48* (2013.01)

(58) Field of Classification Search
CPC .. B64C 13/28; B64C 3/26; B64C 3/48; B64C 2003/445; B64C 3/50; B64C 9/02; B64C 9/16; B64C 9/00; Y02T 50/40
See application file for complete search history.

(56) References Cited

U.S. PATENT DOCUMENTS 3,109,613 A   11/1963   Bryant et al.
3,954,230 A   5/1976   Machuta
(Continued)

FOREIGN PATENT DOCUMENTS

DE   198 52 944 C1   2/2000
DE   19936721 B4   2/2001
(Continued)

OTHER PUBLICATIONS

German Search Report; priority document.

*Primary Examiner* — Assres H Woldemaryam
(74) *Attorney, Agent, or Firm* — Greer, Burns & Crain, Ltd.

(57) ABSTRACT

An actuator arrangement for an aircraft flexible control surface comprises a base and a rotary element having a joint axle articulated on the base. The actuator arrangement comprises at least two attachment struts, each having three joint axles. A first joint axle is rotatably articulated on the rotary element. A second joint axle, arranged at a first strut end, is configured to be articulated on a first control surface skin panel. A third joint axle, arranged at a second strut end, is configured to be articulated on a second control surface skin panel. The actuator arrangement also comprises at least one connecting element having one joint axle at both ends, a first joint axle being articulated on the base and a second joint axle being articulated on one of the two struts, and an actuator configured to rotate the rotary element relative to the base.

15 Claims, 6 Drawing Sheets

(56) References Cited

U.S. PATENT DOCUMENTS

| | | | | |
|---|---|---|---|---|
| 3,994,452 A | * | 11/1976 | Cole | B64C 3/48 |
| | | | | 244/214 |
| 4,605,187 A | * | 8/1986 | Stephenson | B64C 9/18 |
| | | | | 244/216 |
| 5,098,043 A | * | 3/1992 | Arena | B64C 13/26 |
| | | | | 244/215 |
| 6,276,641 B1 | | 8/2001 | Gruenewald et al. | |
| 7,384,016 B2 | | 6/2008 | Kota et al. | |
| 7,896,294 B2 | | 3/2011 | Dittrich | |
| 8,348,201 B2 | | 1/2013 | Pecora et al. | |
| 8,511,608 B1 | * | 8/2013 | Good | B64C 9/18 |
| | | | | 244/99.3 |
| 9,033,283 B1 | | 5/2015 | Hemmelgarn et al. | |
| 2010/0224734 A1 | | 9/2010 | Grip | |
| 2014/0001309 A1 | * | 1/2014 | Tieys | B64C 3/50 |
| | | | | 244/99.3 |
| 2016/0159456 A1 | | 6/2016 | Haslach | |
| 2016/0214705 A1 | * | 7/2016 | Walker | B64C 9/02 |
| 2019/0055005 A1 | * | 2/2019 | Young | B64C 13/28 |
| 2020/0017192 A1 | * | 1/2020 | Gibbert | B64C 9/02 |

FOREIGN PATENT DOCUMENTS

| | | |
|---|---|---|
| DE | 20 2010 016 892 U1 | 8/2011 |
| DE | 102013011917 A1 | 1/2015 |
| EP | 1 661 805 A1 | 5/2006 |
| EP | 2 147 856 A1 | 1/2010 |
| FR | 922899 A | 6/1947 |
| JP | 201437155 A | 2/2014 |
| NL | 2006936 C | 12/2012 |
| WO | 2003082671 A1 | 10/2003 |
| WO | 2004108525 A1 | 12/2004 |

* cited by examiner

ACTUATOR ARRANGEMENT FOR A FLEXIBLE CONTROL SURFACE OF AN AIRCRAFT, CONTROL SURFACE WITH ACTUATOR ARRANGEMENT, AND AIRCRAFT WITH FLEXIBLE CONTROL SURFACE

CROSS-REFERENCES TO RELATED APPLICATIONS

This application claims the benefit of the German patent application No. 10 2017 216 397.6 filed on Sep. 15, 2017, the entire disclosures of which are incorporated herein by way of reference.

BACKGROUND OF THE INVENTION

The invention relates to an actuator arrangement for a flexible control surface of an aircraft, to a flexible control surface having a corresponding actuator arrangement, and to an aircraft having at least one such control surface.

For the control of aircraft, movable parts are arranged on components over which air flows, such as for example wings or a tail unit, in order to influence the flow of the air. Accordingly, at a leading edge (flow impingement edge) and/or at a trailing edge (flow separation edge) of a wing or of a tail unit, there are arranged flaps or rudders which, depending on the flight situation, can vary the flow direction of the air flowing over the components.

At the transition of a fixed outer skin of the wing or of the tail unit and such flaps or rudders, the kinks or even openings which arise in the outer skin impair the aerodynamics of the aircraft and thus increase fuel consumption. To improve the aerodynamics, flexible control surfaces have been proposed which have an extensible and/or flexible outer skin. However, the movement mechanisms for setting a particular shape of the flexible control surfaces are highly complex and thus susceptible to faults.

SUMMARY OF THE INVENTION

The invention is based on an object of providing an actuator arrangement for a flexible control surface of an aircraft, which actuator arrangement is of simple form and permits a fault-free movement of the control surface. Furthermore, it is the intention for a control surface having an actuator arrangement of the type to be provided, which ensures a continuous transition between a movable skin of the control surface and a fixed skin of a wing or of a tail unit.

In this regard, the teaching of the invention concerns an actuator arrangement for a flexible control surface of an aircraft, wherein the actuator arrangement comprises a base element and a rotary element which has a joint axle which is articulated on the base element. Whereas the base element is fixed relative to the flexible control surface and in particular the rotary element, the rotary element is rotatable relative to the base element. For example, it is possible for one or more joints arranged in the joint axle of the rotary element to form a rotatable fastening of the rotary element on the base element.

The actuator arrangement furthermore comprises at least two attachment struts, which have, in each case, three joint axles, wherein a first joint axle of each attachment strut is rotatably articulated on the rotary element, wherein a second joint axle, arranged at a first end of each attachment strut, is designed to be articulated on a first skin panel of the control surface, and wherein a third joint axle, arranged at a second end of each attachment strut, is designed to be articulated on a second skin panel of the control surface. In this case, too, it is possible for one or more joints to be arranged in each of the rotary axles, which joint(s) form(s) a rotatable fastening of the attachment strut on the rotary element or a rotatable fastening of the first or second skin panel of the control surface on the attachment strut.

The attachment struts may be arranged parallel to one another. In this way, a symmetrical orientation of the skin panels can be achieved. Furthermore, by means of a parallel arrangement of the attachment struts, the symmetry thereof can be ensured more easily during the movement of the skin panels and thus of the control surface.

The actuator arrangement furthermore also comprises at least one connecting element, which has, in each case, one joint axle at both ends, wherein a first joint axle of the connecting element is articulated on the base element, and wherein a second joint axle of the connecting element is articulated on one of the at least two attachment struts. One or more joints arranged in the respective joint axle of the connecting element form(s) a rotatable fastening of the connecting element on the base element or on the attachment strut, whereby the joints effect a transmission of force between base element and attachment strut through the connecting element.

Finally, the actuator arrangement furthermore comprises an actuator, which is designed to rotate the rotary element relative to the base element. Here, the at least one connecting element may effect, on the basis of the rotation of the rotary element relative to the base element, a rotation of the attachment strut, which is articulated on the second joint axle of the connecting element, about the first joint axle thereof and relative to the rotary element. This rotation of the attachment strut articulated on the connecting element is effected by means of the transmission of force between the two joint axles of the connecting element (pushing or pulling force in a longitudinal direction of the connecting element), wherein the force is generated on the connecting element owing to the shift in position of the first joint axle of the attachment strut, and thus of the attachment strut as a whole, relative to the position of the first joint axle of the connecting element, which is attached to the base element.

Since the first and second skin panels are each rotatably fastened on the at least two attachment struts, which in turn are rotatably fastened on the rotary element, the rotational movement of the rotary element causes a joint rotational movement of the first and second skin panels (together with the rotary element), and the rotation, caused by the connecting element, of one attachment strut causes a displacement of the first and second skin panels relative to one another. In other words, the first and second skin panels each perform a movement relative to the rotary element, wherein the skin panels are moved relative to one another in opposite directions. Owing to the flexibility of the control surface, that is to say of the skin panels, the two skin panels can, owing to their opposite movements, be curved, for example if they are connected rotationally fixedly to one another at one point.

Thus, a control surface can be moved by means of a simple construction of the actuator arrangement, that is to say, with a small number of components and with a single actuator. Furthermore, the actuator arrangement can be of compact design, whereby space for other elements is available between the two skin surfaces. Since the actuator arrangement is composed only of a small number of articulatedly connected components, it also exhibits low susceptibility to faults. Finally, the combination of the rotational movement of the rotary element and the rotational movement of the attachment struts permits increased freedom of movement of the skin panels of the control surface, such that a small movement of the actuator is boosted. This likewise permits a spatially small design of the actuator.

In one design variant, the joint axle of the rotary element and in each case the first joint axle of each attachment strut are arranged parallel to one another and perpendicularly to a common line. The opposite movement of the skin panels relative to the rotary element is facilitated by means of this arrangement of the joint axles. A rotational movement of the at least two attachment struts, while maintaining the optional parallel arrangement of the attachment struts, is made possible by means of this arrangement of the joint axles.

In a further design variant, each of the attachment struts may be arranged perpendicular to the respective first joint axle of the corresponding attachment strut and, furthermore, when the rotary element is situated in a basic position relative to the base element, each of the attachment struts may be arranged perpendicular to the common line. In other words, it is also the case that each of the attachment struts is situated in a basic position, wherein the basic position of the attachment struts permits a symmetrical arrangement of the first and second skin panels relative to the common line between the joint axles of the rotary element and the attachment struts.

A further variant provides for each of the at least one connecting element to cross the common line of the joint axles of the rotary element and of the attachment struts. This crossing configuration of the at least one connecting element with the common line boosts the movement of the skin panels in accordance with the rotational movement of the rotary element relative to the base element. Otherwise (if the at least one connecting element were situated entirely on one side of the common line), the rotational movement of the rotary element relative to the base element would effect an opposite rotational movement of the attachment struts and thus an opposite rotational movement of the skin panels. As a result, the rotational movement of the rotary element would be at least partially cancelled out again by the opposite rotational movement of the attachment struts.

Furthermore, the at least one connecting element may comprise two pull cables. Here, a first of the two pull cables crosses the common line of the joint axles of the rotary element and of the attachment struts in a different direction to a second of the two pull cables. In other words, the first pull cable is rotatably connected to the attachment strut on a first side of the common line, whereas the first pull cable is rotatably connected to the base element on a second side, situated opposite the first side, of the common line. In turn, the second pull cable is rotatably connected to the attachment strut on the second side of the common line, and is rotatably connected to the base element on the first side of the common line. Depending on the direction of rotation of the rotary element relative to the base element, one of the two pull cables exerts a pulling force on the attachment strut, whereby the rotational movement of the attachment strut relative to the rotary element is effected. The use of pull cables permits a flat construction of the actuator arrangement.

Alternatively, the at least one connecting element may comprise a shear-resistant traverse. The shear-resistant traverse is also rotatably connected at one end to the attachment strut on a first side of the common line and at an opposite end to the base element on a second side, situated opposite the first side, of the common line. Since the shear-resistant traverse can transmit both pushing forces and pulling forces between the attachment strut and the base element, the single connecting element is sufficient to effect the relative rotational movement of the attachment strut with respect to the rotary element for both directions of rotation of the rotary element relative to the base element. The use of a single shear-resistant traverse permits a weight saving in relation to the use of multiple connecting elements.

In a further embodiment, each of the first joint axles of each attachment strut may be arranged in the center of the respective attachment strut. In this way, a symmetrical construction of the actuator arrangement can be realized. Alternatively, each of the first joint axles of each attachment strut may also be arranged so as to be spaced apart to equal extents from the center of the respective attachment strut. In this way, a predefined asymmetry of the actuator arrangement can be achieved, which permits, for example, pre-alignment of the skin panels (of the control surface) to a particular side (of the common line).

In a further embodiment, the second joint axle of the connecting element is articulated between the first and second joint axles of the attachment strut or between the first and third joint axles of the attachment strut. The further remote the second joint axle of the connecting element is from the first joint axle of the attachment strut, the greater is the lever arm of the connecting element, and thus the more easily the articulated attachment strut can be rotated relative to the rotary element. Furthermore, the spacing of the second joint axle of the connecting element to the first joint axle of the attachment strut determines the degree of the relative movement of the attachment strut with respect to the rotary element. The smaller the spacing is, the greater is the relative movement.

In a further embodiment, the actuator may comprise a shear-resistant traverse rotatably fastened on the rotary element. The shear-resistant traverse may, for example, be rotatably fastened on the rotary element, wherein a joint axle of the rotatable fastening of the shear-resistant traverse on the rotary element is spaced apart from the joint axle of the rotary element. In this way, a rotational movement of the rotary element about its joint axle can be effected by means of a simple linear movement of the shear-resistant traverse.

Alternatively or in addition, the actuator may comprise a pneumatic or hydraulic drive. Thus, the actuator may comprise a pneumatically or hydraulically operated piston, which can perform a linear movement. The linear movement can, for example by means of a connecting rod or the shear-resistant traverse, be transmitted to the rotary element, wherein the connecting rod or shear-resistant traverse is rotatably fastened on the rotary element. Thus, a rotational movement of the rotary element about its joint axle is generated in a manner dependent on a spacing of the rotatable fastening of the connecting rod or of the shear-resistant traverse from the joint axle of the rotary element.

It is likewise alternatively or additionally possible for the actuator to comprise an actuating motor. The actuating motor may for example be designed to rotate a gearwheel, and move the gearwheel into any desired position (for example relative to the base element). A toothed rack or a further gearwheel may mesh with the gearwheel. The toothed rack may be rotatably coupled to the rotary element, wherein a joint axle of the toothed rack at the connecting point to the rotary element is spaced apart from the joint axle of the rotary element. In the case of a further gearwheel, this may be fastened on the rotary element or integrated therein, wherein an axis of rotation of the further gearwheel coincides with the joint axle of the rotary element. In both cases, a rotation of the gearwheel by means of the actuating motor effects a rotational movement of the rotary element about its joint axle.

In each of the design variants of the actuator, the actuator may additionally comprise a gearing. By means of a corresponding transmission ratio in the gearing, the actuator can be designed to be smaller (more compact) and also arranged closer to the joint axle of the rotary element.

Finally, the actuator may be provided or integrated in the base element.

According to a further aspect, a control surface for an aircraft comprises an actuator arrangement according to the described aspect or one of the described embodiments and variants. Furthermore, the control surface may comprise a first flexurally elastic skin panel, which is rotatably fastened on the second joint axle of each attachment strut, and a second flexurally elastic skin panel, which is rotatably fastened on the third joint axle of each attachment strut. In other words, the first skin panel is rotatably fastened on each attachment strut, and the second skin panel is likewise rotatably fastened on each attachment strut. Thus, the first skin panel is fastened on a first end of each attachment strut and the second skin panel is fastened on the respective opposite end of each attachment strut.

The skin panels of the control surface may each extend between the corresponding end of each attachment strut and extend further beyond this in both directions. In the basic position of the attachment struts, at least one of the skin panels may be arranged perpendicular to the attachment struts. Furthermore, in an adjoining region, at least one of the skin panels may be bent or curved. Furthermore, the first and second skin panels of the control surface may be connected to one another at a remote location as viewed from the actuator arrangement. The first and second skin panels thus form a body which is open on one side, wherein at least the attachment struts and parts of the rotary element are arranged in the opening of the body thus formed. The lengths of the attachment struts in this case determine the spacing of the first and second skin panels in the region of the opening of the body thus formed.

Alternatively, the first and second skin panels may be produced from one continuous material, wherein the material extends, in the region of the first skin panel, away from the actuator arrangement, forms a turning point, and extends, in the region of the second skin panel, back to the actuator arrangement. The material may be a fiber-reinforced plastic or a metal, such as, for example, aluminum.

In each case, the control surface has a location which is spaced apart to the greatest extent from the actuator arrangement. The location may form a flow impingement edge (leading edge) or flow separation edge (trailing edge) of a wing or of a tail unit.

Furthermore, the control surface may comprise at least one spar arranged between the first skin panel and the second skin panel. The at least one spar is arranged in a region between the first skin panel and the second skin panel in which the actuator arrangement, and in particular the attachment struts, is/are not arranged.

Here, the at least one spar may comprise a flexurally elastic spar, which is connected rotationally fixedly to the first skin panel and to the second skin panel. The flexurally elastic spar may, in a cross section of the wing or of the tail unit, have a curved shape (for example approximately semicircular), wherein an opening of the curved shape points towards the actuator arrangement. The at least one flexurally elastic spar firstly stabilizes the control surface formed by the first and second skin panels, owing to the connection of the spar to both skin panels. Secondly, the at least one flexurally elastic spar furthermore permits bending of at least one of the skin panels owing to the opposite movement, effected by the actuator arrangement, of the first skin panel relative to the second skin panel.

Alternatively or in addition, the at least one spar may comprise a rigid spar, which is connected by means of in each case one joint to the first skin panel and to the second skin panel. The rigid spar likewise stabilizes the two skin panels of the control surface and furthermore, by means of the arrangement of the joints, permits the opposite movement of the first skin panel relative to the second skin panel. The joints are arranged on an inner side of the two mutually oppositely situated skin panels. Furthermore, the spacing between the first and second skin panels is maintained by means of the rigid spar even during the opposite movement of the two skin panels relative to one another.

According to a further aspect, an aircraft comprises at least one flexible control surface in one of the described embodiments and variants.

The aircraft furthermore comprises a wing and/or a tail unit, wherein the base element of the actuator arrangement comprised in the control surface is fastened on or integrated on an immovable component of the wing or of the tail unit. The immovable component of the wing or of the tail unit may be a spar arranged in the longitudinal direction of the wing or of the tail unit. The base element of the actuator arrangement may self-evidently also be fastened or integrated on one or more ribs arranged in a transverse direction of the wing or of the tail unit.

Alternatively or in addition, the first skin panel of the control surface may be arranged flush with a first outer skin of the wing or of the tail unit. Furthermore, the second skin panel of the control surface may be arranged flush with a second outer skin, which is situated opposite the first outer skin, of the wing or of the tail unit. In other words, the first and second skin panels form sections of the two outer skins of the wing or of the tail unit, which sections are situated opposite one another in a cross section of the wing or of the tail unit.

Owing to the opposite movement of the first skin panel relative to the second skin panel, a section of extensible outer skin may be arranged between the respective outer skin of the wing or of the tail unit and the corresponding skin panel. Alternatively, the first skin panel and/or the second skin panel may comprise an extensible material at least in sections, such that, at the transition between skin panel and the rest of the outer skin of the wing or of the tail unit, no opening is formed as a result of the movement, effected by the actuator arrangement, of the control surface.

Furthermore, the first and second skin panels form a flow impingement edge (leading edge) or flow separation edge (trailing edge) of the wing or of the tail unit. In other words, the control surface is arranged at the flow impingement edge or flow separation edge of the wing or of the tail unit, wherein the first and second skin panels are the outer skin, which forms the flow impingement edge or flow separation edge, of the wing or of the tail unit.

The arrangements, described here, of the components of the actuator arrangement and of the control surface relate in particular to a view in a cross section of the wing or of the tail unit. Thus, it is for example possible for all of the joint axles, described here, of the actuator arrangement to lie parallel to one another and to be arranged substantially perpendicular to a cross-sectional plane of the wing or of the tail unit. It is also possible for the joint axles of the actuator arrangement to be arranged parallel to the longitudinal direction of the wing or of the tail unit.

Furthermore, the skin panels of the control surface are flowed over by air, whose flow direction is sought to change by means of the skin panels. Thus, viewed in the longitudinal direction of the wing or of the tail unit, all of the joint axles of the actuator arrangement may be arranged parallel to an outer skin of the wing or of the tail unit. The joint axles may for example lie substantially perpendicular (that is to say, at an angle of 90°+/−10°) with respect to the flow direction of the air.

Instead of an aircraft, the actuator arrangement and control surfaces described here may also be arranged on other vehicles, including motor vehicles and watercraft. Owing to the control by means of the actuator arrangement, the flow of any fluid flowing over the skin panels of the control surface can be influenced.

BRIEF DESCRIPTION OF THE DRAWINGS

Exemplary embodiments of the invention will be described in more detail below on the basis of the drawings.

DETAILED DESCRIPTION OF THE PREFERRED EMBODIMENTS

According to the invention described herein, an actuator arrangement for a control surface, a control surface for an aircraft, and a corresponding aircraft are provided.

Figure 1:
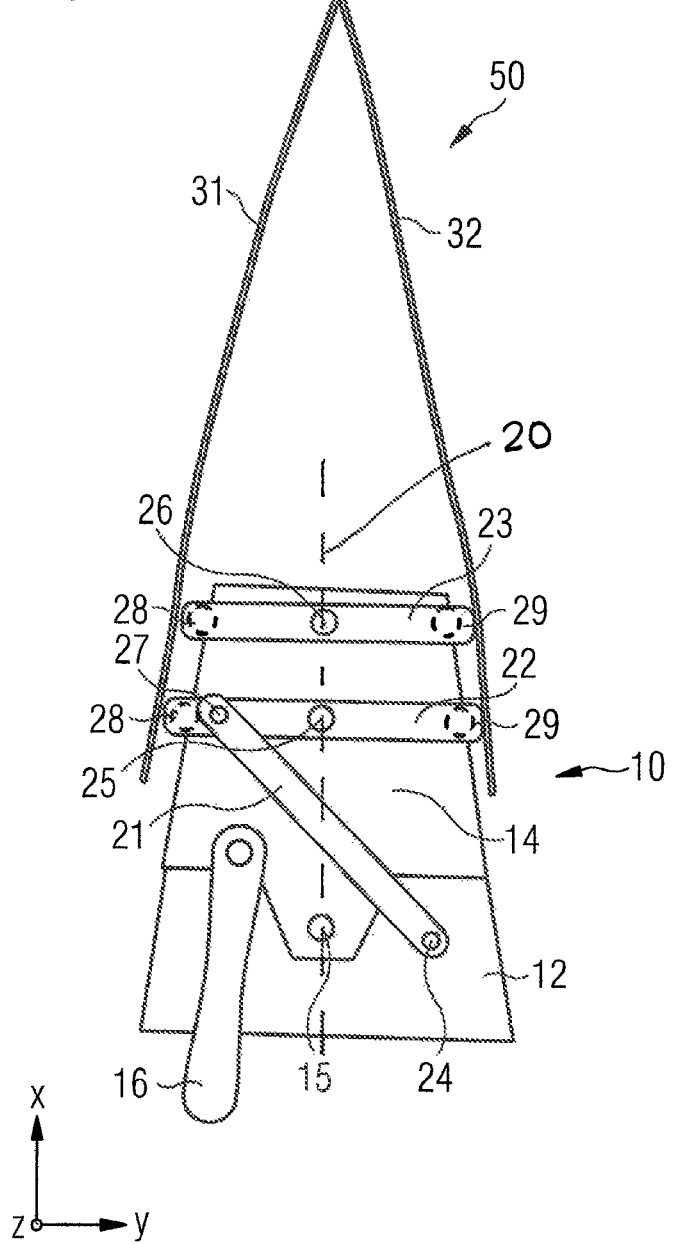
FIG. 1 schematically shows a cross section of an exemplary actuator arrangement with two skin panels which form corresponding control surfaces.

FIG. 1 illustrates an exemplary actuator arrangement 10 in the cross section of a wing or of a tail unit of an aircraft in which the actuator arrangement may be comprised. During flight operation of the aircraft, the actuator arrangement 10 is flowed around, on the right and on the left in FIG. 1, by air, which flows either from top to bottom or from bottom to top in FIG. 1 (for example in an X axis direction, which corresponds to a flight direction or longitudinal axis of the aircraft). The actuator arrangement 10 comprises a base element 12 and a rotary element 14. The rotary element 14 has a joint axle 15 which is articulated on the base element 12. One or more joints (hidden in FIG. 1) may be situated on the joint axles 15, which joint(s) fasten the rotary element 14 rotatably on the base element 12.

The actuator arrangement 10 furthermore comprises two attachment struts 22, 23, which each have three joint axles. Here, the attachment struts 22, 23 may be arranged parallel to one another. A first of the joint axles 25 or 26 is articulated rotatably on the rotary element 14. Here, too, a joint (not explicitly illustrated) is provided on the respective joint axle 25, 26, whereby the respective attachment strut 22, 23 is rotatably fastened on the rotary element. At each end of each attachment strut 22, 23, there is furthermore arranged a second joint axle 28, on which a first skin panel 31 can be articulated. On the opposite side of each attachment strut 22, 23, there is arranged a third joint axle 29, on which a second skin panel 32 can be articulated. Joints for the rotatable fastening of the respective skin panel 31, 32 may likewise be provided on each of the second and third joint axles 28, 29.

Figure 7:
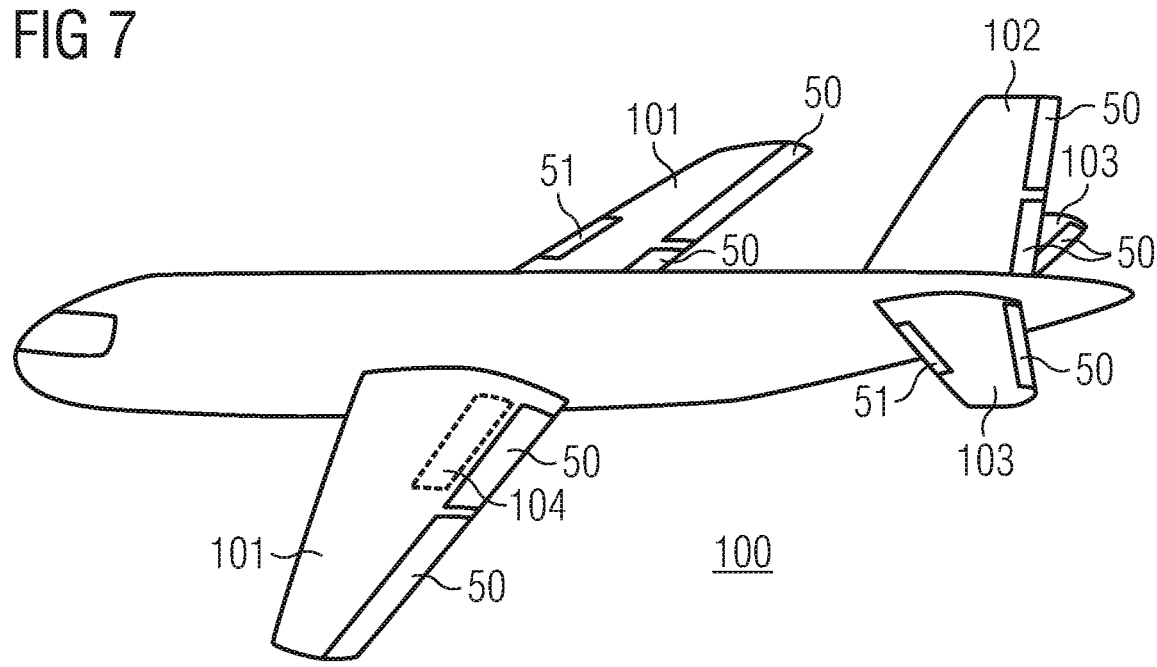
FIG. 7 shows an aircraft with a multiplicity of exemplary control surfaces.

The skin panels 31, 32 form outer skins of a wing 101 or of a tail unit 102, 103 of an aircraft, as illustrated in FIG. 7. Here, the skin panels 31, 32 form control surfaces 50 at a flow separation edge ("trailing edge") of the wing 101 or of the tail unit 102, 103. It is likewise possible for control surfaces 51 to be formed at a flow impingement edge or leading edge of the wing 101 or of the tail unit 103 in the embodiment described here.

In the case of the control surface 50 illustrated in FIG. 1, the Z axis illustrated runs perpendicular to the drawing plane, wherein the Z axis generally constitutes, in aircraft, an axis running vertically through the aircraft. Thus, the illustrated control surface 50 is arranged in a section of a vertically arranged tail unit 102. The illustrated control surface 50, 51 may self-evidently also be a control surface 50, 51 in a wing 101 or a horizontal tail unit 103. For this purpose, it would merely be necessary for the labelling of the Y axis and of the Z axis to be exchanged (wherein the Y axis generally constitutes, in aircraft, the horizontal direction running perpendicular to the flight direction).

To form the flow separation edge or flow impingement edge, the two skin panels 31, 32 are connected to one another. Alternatively, the skin panels 31, 32 are manufactured from one workpiece, which is correspondingly diverted or bent (has a turning point) at the flow separation edge or flow impingement edge. FIG. 1 illustrates a flow separation edge in the case of which the skin panels 31, 32 meet at an acute angle. In particular at a flow impingement edge, however, the skin panels 31, 32 form a continuous, aerodynamically efficient curvature.

The base element 12 comprised in the actuator arrangement 10 may be fastened to a fixed component 104 of the wing 101 or of the tail unit 102, 103. Alternatively, the base element 12 of the actuator arrangement 10 may be integrated in such a component 104, such that the rotary element 14 is articulated on the fixed component 104. It is likewise alternatively or additionally possible for the component 104 of the wing 101 or of the tail unit 102, 103 to also itself be part of an already movable component of the wing 101 or of the tail unit 102, 103. In this way, the actuator arrangement and the skin panels 31, 32 can effect an additional movement of a section of the wing 101 or of the tail unit 102, 103.

The actuator arrangement 10 furthermore comprises at least one connecting element 21 which, in FIG. 1, is shown in the form of a shear-resistant traverse 21. The connecting element 21 has, in each case, one joint axle at the two opposite ends, wherein a first joint axle 24 of the connecting element 21 is articulated on the base element 12, and a second joint axle 27 of the connecting element 21 is articulated on one of the at least two attachment struts 22, 23. The actuator arrangement 10 illustrated in FIG. 1 has a connecting element 21 which is articulated on that attachment strut 22 which is situated closest to the base element 12. In this way, the connecting element 21 can be designed to be of lower weight than in the case of a fastening to that attachment strut 23 which is situated further remote from the base element 12, which would however make it possible to realize better lever actions.

Finally, the actuator arrangement 10 also comprises an actuator, which is designed to rotate the rotary element 14 relative to the base element 12. In a simple embodiment as shown in FIG. 1, the actuator has a shear-resistant traverse 16 rotatably fastened on the rotary element 14. The traverse 16 may be moved by any desired movement device (not shown). By displacement of the traverse 16 (in the X axis direction and FIG. 1), the rotary element 14 is rotated relative to the base element 12 about the joint axle 15 of the rotary element.

The joint axle 15 of the rotary element 14 and in each case the first joint axle 25, 26 of each attachment strut 22, 23 are arranged parallel to one another (in the Z axis direction perpendicular to the drawing plane of FIG. 1) and lie on a common line 20 (for example in the X and/or Y axis direction parallel to the drawing plane in FIG. 1). The common line may constitute an axis of symmetry of the rotary element 14 and/or of the base element 12.

FIG. 1 furthermore shows a basic position of the actuator arrangement 10, in which the rotary element 14 is situated in a basic position relative to the base element 12. In this basic position, each of the attachment struts 22, 23 is arranged perpendicular to the common line. Thus, the skin panels 31, 32 are also situated in a basic position. For example, the flow separation edge formed by the skin panels 31, 32, as illustrated in FIG. 1, may likewise be situated on the common line, whereby the skin panels 31, 32, the attachment struts 22, 23 and the rotary element 14 may be arranged symmetrically with respect to the common line.

It is self-evidently possible for the flow separation edge or flow impingement edge to also be arranged spaced apart from the common line, that is to say, for the skin panels 31, 32 to point in a particular direction. This deviation from the common line may be necessitated by the aerodynamics of the wing 101 or of the tail unit 102, 103.

The at least one connecting element 21 crosses the common line of the joint axle 15 of the rotary element 14 and of the joint axles 25, 26 of the attachment struts 22, 23. Here, a single connecting element 21, as illustrated in FIG. 1, in the actuator arrangement 10 may suffice if the connecting element 21 transmits both pulling and pushing forces between the joint axles 24 and 27 of the connecting element 21.

Figure 2:
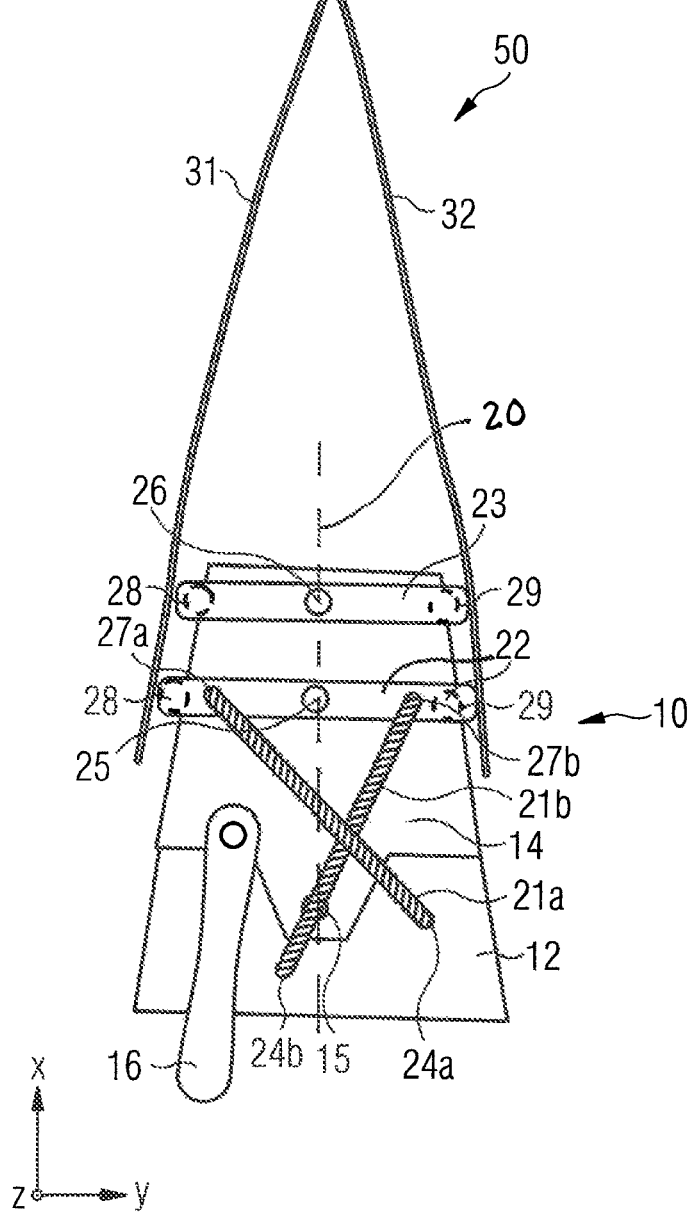
FIG. 2 schematically shows a cross section of a further exemplary actuator arrangement with two skin panels which form corresponding control surfaces.

FIG. 2 shows a further embodiment of the at least one connecting element 21, which makes it possible to realize an actuator arrangement 10 of lower weight. In the further embodiment, instead of a shear-resistant connecting element 21, two pull cables 21a, 21b are provided in the actuator arrangement 10. All of the other components of the actuator arrangement 10 and of the skin panels 31, 32 correspond to the embodiment from FIG. 1.

The first pull cable 21a crosses the common line of the joint axle 15 of the rotary element 14 and of the joint axles 25, 26 of the attachment struts 22, 23 in the same way as, or in a similar way to, the shear-resistant connecting element 21 from FIG. 1. Since the first pull cable 21a however cannot transmit pushing forces, a second pull cable 21b is provided, which crosses the common line of the joint axle 15 of the rotary element 14 and of the joint axles 25, 26 of the attachment struts 22, 23 in the opposite direction. In other words, the second pull cable 21b has a first joint axle 24b which is articulated on the base element 12 and which is situated on the opposite side of the common line in relation to a first joint axle 24a of the first pull cable 21a. Furthermore, a second joint axle 27b of the second pull cable 21b is articulated on the attachment strut 22 and is situated on the opposite side of the common line in relation to a second joint axle 24a of the first pull cable 21a.

With reference to FIGS. 1 and 2, the second joint axle 27, 27a of the connecting element 21, 21a is thus articulated between the first joint axle 25 and the second joint axle 28 of the attachment strut 22, whereas, with reference to FIG. 2, the second joint axle 27b of the connecting element, in this case of the second pull cable 21b, is articulated between the first joint axle 25 and the third joint axle 29 of the attachment strut 22.

This respective arrangement of the at least one connecting element 21, 21a, 21b (hereinafter summarized using the reference designation 21) and of the fastening of the first joint axle 24, 24a, 24b (hereinafter summarized using the reference designation 24) of the at least one connecting element 21 on the base element 12 effects a rotation of the attachment strut 22 on which the second joint axle 27, 27a, 27b (hereinafter summarized using the reference designation 27) of the connecting element 21 is articulated. This rotation of the attachment strut 22 takes place about the first joint axle 25 of the attachment strut 22 relative to the rotary element 14 when the actuator 16 rotates the rotary element 14 relative to the base element 12 and, here, the connecting element 21 acts on the articulated attachment strut 22. Furthermore, the skin panels 31, 32 are rotatably fastened on the respective joint axles 28 and 29 of the attachment struts 22 and 23 respectively, such that a rotational movement of the attachment strut 22 effects an opposite displacement of the skin panels 31, 32 relative to one another.

Figure 3:
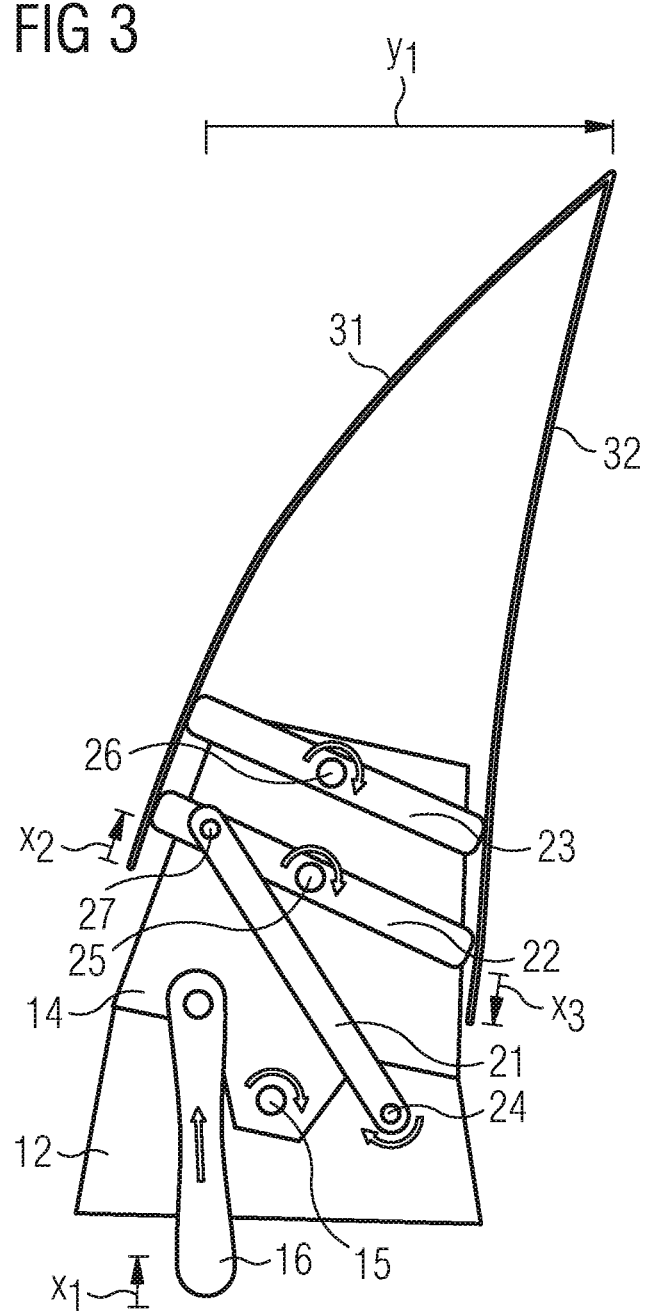
FIG. 3 schematically shows a deflection of the control surfaces by means of the actuator arrangement from FIG. 1.
Figure 4:
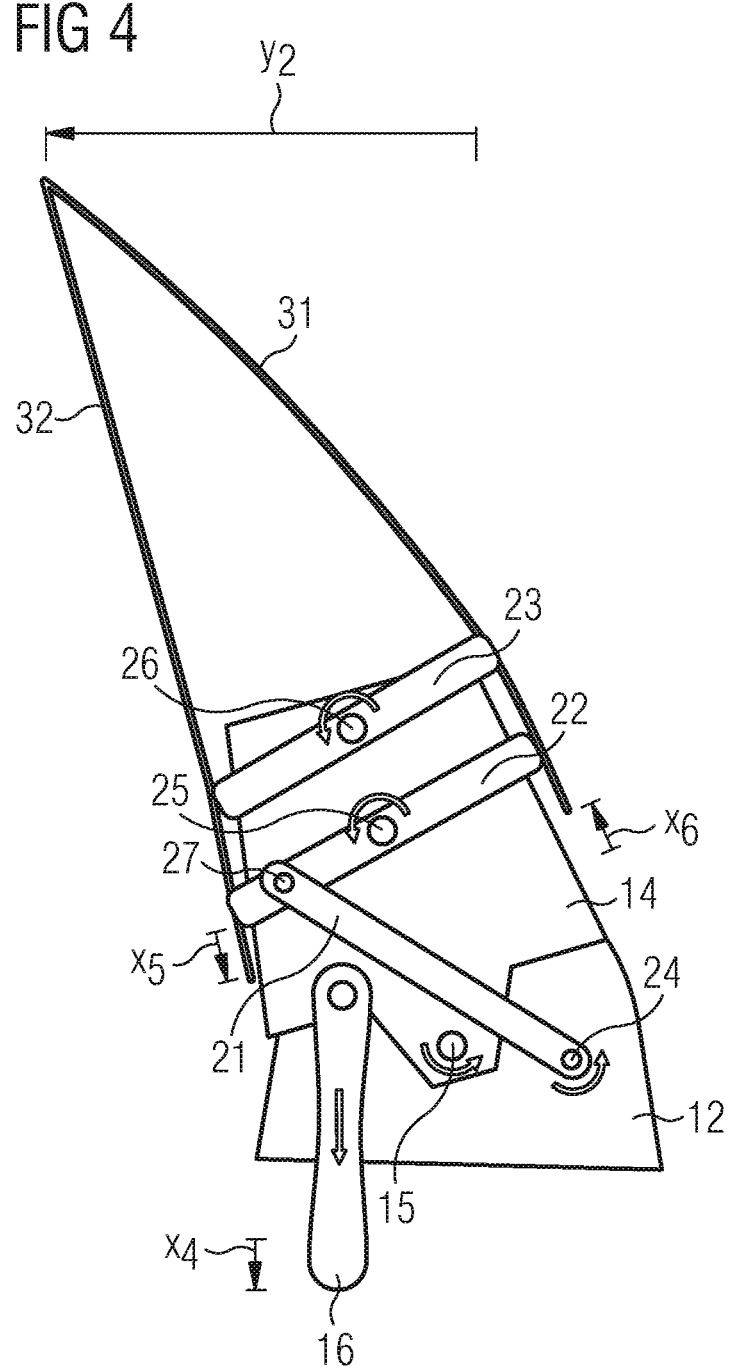
FIG. 4 schematically shows a deflection of the control surfaces by means of the actuator arrangement from FIG. 1 in the opposite direction to the deflection from FIG. 3.

This is illustrated in FIGS. 3 and 4. In FIG. 3, the actuator 16 is moved upwards, that is to say, the rotary element 14 is rotated clockwise about its joint axle 15 relative to the base element 12. The shear-resistant traverse 16 may in this case perform a substantially linear movement by the value X1. As a result, the second joint axle 27 of the shear-resistant connecting element 21 likewise moves about the joint axle 15 of the rotary element 14. Since the spacing between the two joint axles 24 and 27 of the connecting element 21 remains the same owing to the shear-resistant connecting element 21, the attachment strut 22 is likewise rotated clockwise, but also relative to the rotary element 14. In the case of the arrangement of two pull cables 21a, 21b (FIG. 2), the attachment strut 22 is likewise rotated clockwise relative to the rotary element 14, because the spacing of the first joint axle 24b to the second joint axle 27b of the second pull cable 21b remains the same.

Thus, the first skin panel 31, which is rotatably fastened on the second joint axle 28 of the attachment strut 22, performs a movement relative to the rotary element 14 by the distance X2, which movement is transmitted by the skin panel 31 to the second attachment strut 23, and, in particular, to the second joint axle 28 thereof. The second skin panel 32, which is in each case rotatably fastened on the third joint axles 29 of the attachment struts 22 and 23, likewise performs an opposite movement relative to the rotary element 14 by the value X3. If the spacing of the second joint axles 28 to the respective first joint axle 25, 26 of the attachment struts 22, 23 is equal to the spacing of the third joint axles 29 to the respective first joint axle 25, 26 of the attachment struts 22, 23, then X2 and X3 are also equal. By changing the position of the respective first joint axle 25, 26 of the attachment struts 22, 23, the ratio between X2 and X3 can be changed correspondingly.

Owing to the rigid attachment struts 22 and 23 and the ratio between the length of the attachment struts 22, 23 and the relative movements X2 and X3, which are small in relation to the former, the spacing between the skin panels 31, 32 in the region of the attachment struts 22, 23 changes only very slightly, such that the relative movements of the skin panels 31, 32 with respect to the rotary element 14 are approximately linear movements.

By means of the flexurally elastic material of the skin panel 31, 32 and the common connecting point (or turning point) of the skin panels 31, 32, the skin panels 31, 32 undergo bending in the direction of rotation of the rotary element 14 relative to the base element 12. Thus, the common connecting point of the skin panels 31, 32 is moved by the distance Y1 clockwise in accordance with the movement of the rotary element 14 relative to the base element 12. By means of this arrangement and the opposite relative movement of the skin panels 31, 32, boosting of the movement of the connecting point of the skin panels 31, 32 is realized. In other words, the connecting point of the skin panels 31, 32 is deflected further than would be the case solely on the basis of the rotational movement of the rotary element 14 relative to the base element 12.

FIG. 4 shows the movement in the opposite direction, wherein, for example, the shear-resistant traverse 16 of the actuator is moved by the value X4 and effects a rotational movement of the rotary element 14 counterclockwise relative to the base element 12. Correspondingly, the skin panels 31, 32 are moved (again approximately) linearly in opposite directions relative to the rotary element 14 by the distances X5 and X6 by means of the attachment struts 22, 23, while the connecting point of the skin panels 31, 32 is moved correspondingly by the distance Y2 in a counterclockwise direction.

Figure 5:
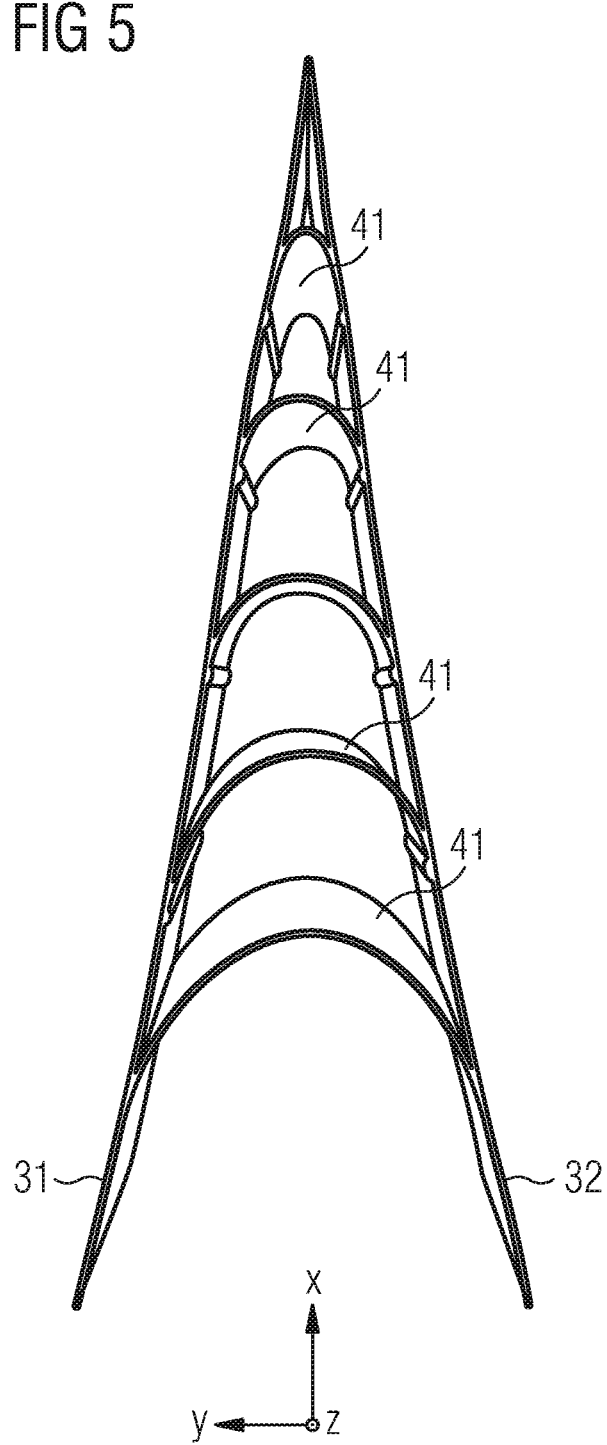
FIG. 5 schematically shows a control surface with flexurally elastic spars.
Figure 6:
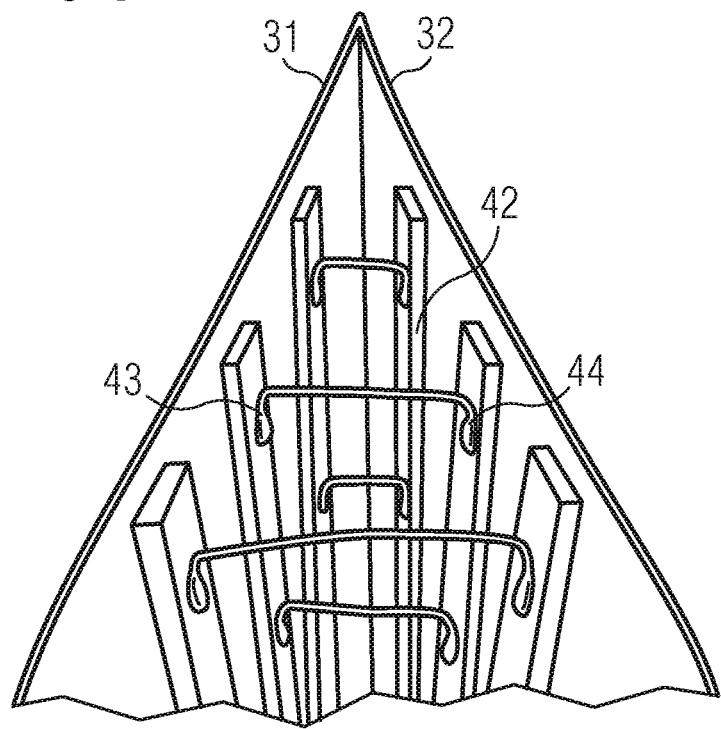
FIG. 6 schematically shows a control surface with rigid, rotatably mounted spars.

Spars may be situated in a region between the skin panels 31, 32 and between the rotary element 14 or the attachment struts 22, 23 and a common connecting point (or turning point) of the skin panels 31, 32. FIG. 5 illustrates spars 41 of the type, which are produced from a flexurally elastic material and which are fixedly connected at their respective ends to the first skin panel 31 and to the second skin panel 32. FIG. 6 shows alternative spars 42, which are produced from a rigid, shear-resistant material and which are rotatably connected, at corresponding joints 43, 44, to the respective skin panel 31 or 32.

The spars 41, 42 increase the stability of the skin panels 31, 32 and thus of the control surfaces 50, 51. Owing to the flexibility of the spars 41 and the rotatable fastening of the spars 42 to the skin panels 31, 32, the movement, illustrated in FIGS. 3 and 4, of the skin panels 31, 32 relative to the rotary element 14 (see movements X1, X2, X5 and X6 and Y1 and Y2) remains ensured.

Finally, it is in particular pointed out that the variants, embodiments and exemplary embodiments discussed above serve merely for describing the claimed teaching, but do not restrict the teaching to the variants, embodiments and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft flexible control surface actuator arrangement, wherein the actuator arrangement comprises:
   a base element;
   a rotary element, which has a joint axle articulated on the base element;
   at least two attachment struts, each attachment strut having three joint axles, wherein a first joint axle of each attachment strut is rotatably articulated on the rotary element, wherein a second joint axle, arranged at a first end of each attachment strut, is configured to be articulated on a first skin panel of the control surface, and wherein a third joint axle, arranged at a second end of each attachment strut, is configured to be articulated on a second skin panel of the control surface;
   at least one connecting element, each connecting element having one joint axle at both ends, wherein a first joint axle of the connecting element is articulated on the base element, and wherein a second joint axle of the connecting element is articulated on one of the at least two attachment struts; and
   an actuator, configured to rotate the rotary element relative to the base element,
   wherein the at least one connecting element effects, on the basis of a rotation of the rotary element relative to the base element, a rotation of the attachment strut, which is articulated on the second joint axle of the connecting element, about the first joint axle thereof and relative to the rotary element.

2. The actuator arrangement according to claim 1, wherein the joint axle of the rotary element and the first joint axle of each attachment strut, are arranged parallel to one another and perpendicularly on a common line.

3. The actuator arrangement according to claim 2, wherein each of the attachment struts is arranged perpendicular to the respective first joint axle of the corresponding attachment strut and, furthermore, when the rotary element is situated in a basic position relative to the base element, is arranged perpendicular to the common line.

4. The actuator arrangement according to claim 2, wherein each of the at least one connecting element crosses a common line of the joint axles of the rotary element and of the attachment struts.

5. The actuator arrangement according to claim 4, wherein the at least one connecting element comprises two pull cables, and wherein a first of the two pull cables crosses the common line of the joint axles of the rotary element and of the attachment struts in a different direction to a second of the two pull cables.

6. The actuator arrangement according to claim 1, wherein the at least one connecting element comprises a shear-resistant traverse.

7. The actuator arrangement according to claim 1, wherein each of the first joint axles of each attachment strut is arranged in a center of the respective attachment strut.

8. The actuator arrangement according to claim 1, wherein the second joint axle of the connecting element is articulated between the first and second joint axles of the attachment strut or between the first and third joint axles of the attachment strut.

9. The actuator arrangement according to claim 1, wherein the actuator comprises a shear-resistant traverse rotatably fastened on at least one of the rotary element, a pneumatic drive, an actuating motor or a gearing.

10. A control surface for an aircraft, comprising:
an actuator arrangement according to claim 1;
a first flexurally elastic skin panel, which is rotatably fastened on the second joint axle of each attachment strut; and
a second flexurally elastic skin panel, which is rotatably fastened on the third joint axle of each attachment strut.

11. The control surface according to claim 10, furthermore comprising at least one spar arranged between the first skin panel and the second skin panel.

12. The control surface according to claim 11, wherein the at least one spar comprises at least one of
a flexurally elastic spar, which is connected rotationally fixedly to the first skin panel and to the second skin panel, or
a rigid spar, which is connected by means of, in each case, one joint to the first skin panel and to the second skin panel.

13. An aircraft comprising at least one control surface according to claim 10.

14. The aircraft according to claim 13, furthermore comprising at least one of
a wing; or
a tail unit,
wherein the base element of the actuator arrangement comprised in the control surface is fastened on or integrated on an immovable component of the wing or of the tail unit.

15. The aircraft according to claim 14, wherein the first skin panel of the control surface is arranged flush with a first outer skin of the wing or of the tail unit, wherein the second skin panel of the control surface is arranged flush with a second outer skin, which is situated opposite the first outer skin, of the wing or of the tail unit.

* * * * *